Nov. 28, 1944. H. W. GILLARD 2,364,022
SCUM SKIMMER
Filed Oct. 24, 1941 2 Sheets-Sheet 1

Herbert W. Gillard
INVENTOR.
BY Robyn Wilcox
ATTORNEY:

Nov. 28, 1944.   H. W. GILLARD   2,364,022
SCUM SKIMMER
Filed Oct. 24, 1941   2 Sheets-Sheet 2
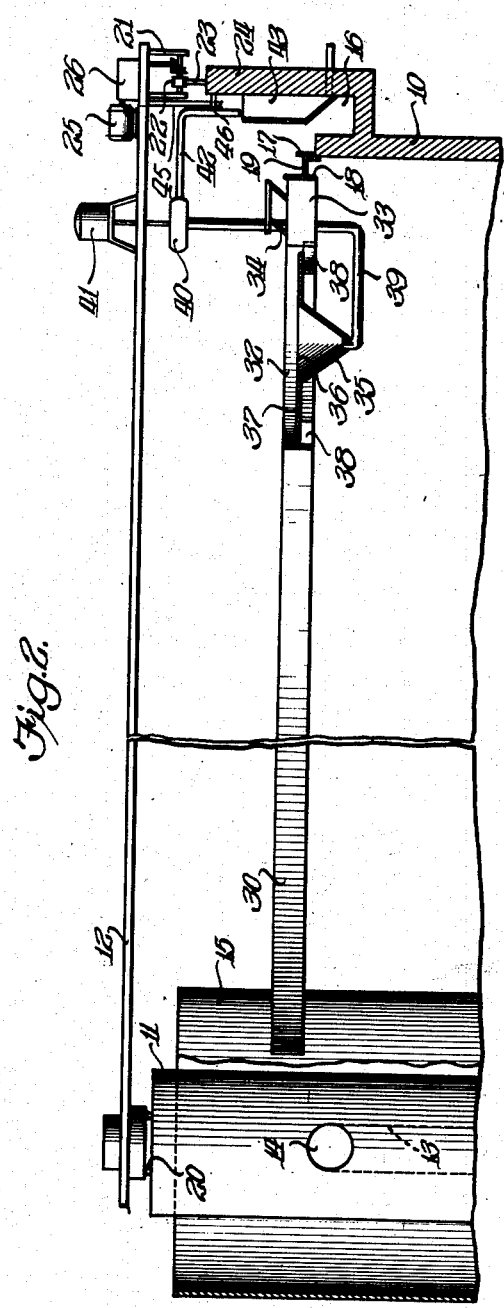
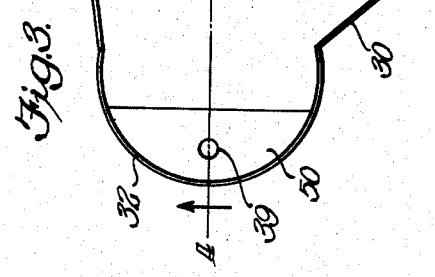
Herbert W. Gillard
INVENTOR.
BY Robyn Hilero
ATTORNEY Patented Nov. 28, 1944

2,364,022

UNITED STATES PATENT OFFICE 2,364,022

SCUM SKIMMER

Herbert W. Gillard, Oak Park, Ill., assignor to Infilco Incorporated, Chicago, Ill., a corporation of Delaware Application October 24, 1941, Serial No. 416,321

15 Claims. (Cl. 210—55)

This invention relates to a separator for removing floatable matter from liquids such as skimming scum from the surface of liquid clarifiers.

An object of this invention is to provide an improved scum skimming device for use in sewage tanks, such as sewage clarifiers or settling basins, or other liquid treatment apparatus.

Another object of this invention is to provide an automatic skimming device for separating floatable solids collecting on a liquid surface from the liquid.

A still further object of this invention is to provide a more efficient scum skimming device than heretofore known.

Other objects of the invention will be apparent from the description and claims which follow.

The skimming device of the present invention is adapted for use in liquid treating apparatus of all types. By way of illustration but without limiting the scope of the invention, the scum skimmer will be described as used in connection with a circular sewage clarifying tank.

In the treatment of liquid, and particularly in the treatment of waste waters such as sewage, solids in suspension in the liquid to be treated are removed by precipitation or settling in a sedimentation chamber commonly called a clarifier. In many such treatments and particularly in the clarification of sewage, a scum will rise to the top of the liquid. It is, of course, not desirable to permit the scum to pass from the clarifier with the effluent and it is equally undesirable to permit the scum to remain on the surface of the liquid. Ordinarily, the effluent from the clarifier is removed therefrom by permitting it to flow into an annular channel around the periphery of the clarifier and adjacent the top edge thereof, the channel being separated from the clarifier by a weir over which the clarified liquid may pass. In order to prevent scum from passing into the effluent channel with the clarified water, it is customary to place a scum baffle adjacent the annular weir and extending a short distance above and below the water level of the clarifier. The scum which floats upon the surface of the liquid will be prevented from passing into the effluent channel by the scum baffle while the clarified liquid can flow thereunder and then upwardly to the weir and into the effluent channel.

Various methods have been used for removing the scum from the surface of the liquid from time to time. For example, a skimmer has been used which comprises a vertical rotatable shaft, a skimmer arm attached thereto, and a hinged scum scraper suspended from the radial arm. The scraper blade is usually placed only at the outer end of the skimmer arm, as the natural movement of the liquid is usually from the center toward the circumference of the tank. In apparatus of the type mentioned a scum box, which may be a trough extending radially from the stationary circular scum baffle, is placed at one or more places along the inside of the scum baffle. The upper edge of the scum box is usually placed slightly above the surface of the liquid so that the liquid cannot drain thereinto. Upon the forward edge of the box, that is, the direction from which the skimmer arm with the attached scum scraper approaches, is placed a scum shelf sloping from the upper edge of the scum box down below the surface of the liquid. The rotation of the skimmer arm and the scum scraper pushes scum which collects upon the surface of liquid in front of it so that when the scraper reaches the scum shelf it will push the scum up along the scum shelf and into the scum box from which it can be removed by any suitable means.

My present invention provides a scum skimmer which operates automatically and which more efficiently removes the scum from the liquid without removing a large volume of the liquid itself. Clearly, in a scum skimmer, it is desirable to remove as much as possible of the scum and to avoid removing excessive amounts of liquid therewith. Briefly, my invention comprises a rotatable skimming blade, preferably one shaped to form an accumulating bay or pocket at, or adjacent, the outer end thereof; a hydraulic skimmer, or funnel-like chamber, preferably with a relatively large flange or skimming plate around the peripheral edges thereof, located in advance of the pocket, the flange or plate being placed at such a distance below the surface of the liquid to produce the velocity that may be required by the character of the liquid to be treated and the amount and type of scum to be removed therefrom; a pipe leading from the lower end of the hydraulic skimmer and out of the clarification tank; and means for pumping material collected in the skimming chamber out of the clarifier. It will be realized that when the pump is operated it will draw the material or liquid which is above the flange or plate through the hydraulic skimming chamber. The hydraulic skimmer plate may be adjustable so that the flange or plate is slightly below the lower face of the scum, whereby the operation of the pump draws the scum into and through the skimming chamber and out of the clarifier without removing objectionable quantities of liquid therewith.

Preferred embodiments of the present invention are shown in the accompanying drawings which form a part of this specification and in which like reference characters in the several figures designated similar elements.

Figure 2 is an enlarged side view, partly in cross section, of the apparatus of Figure 1.

Figure 3 is a plan view of an alternate type of scum skimmer.

Figure 4 is a vertical cross-sectional view of the skimmer shown in Figure 3, at the plane designated by the line 4—4 of Figure 3.

Figure 5 is a cross-sectional view of a second alternate type of skimmer.

Figure 1:
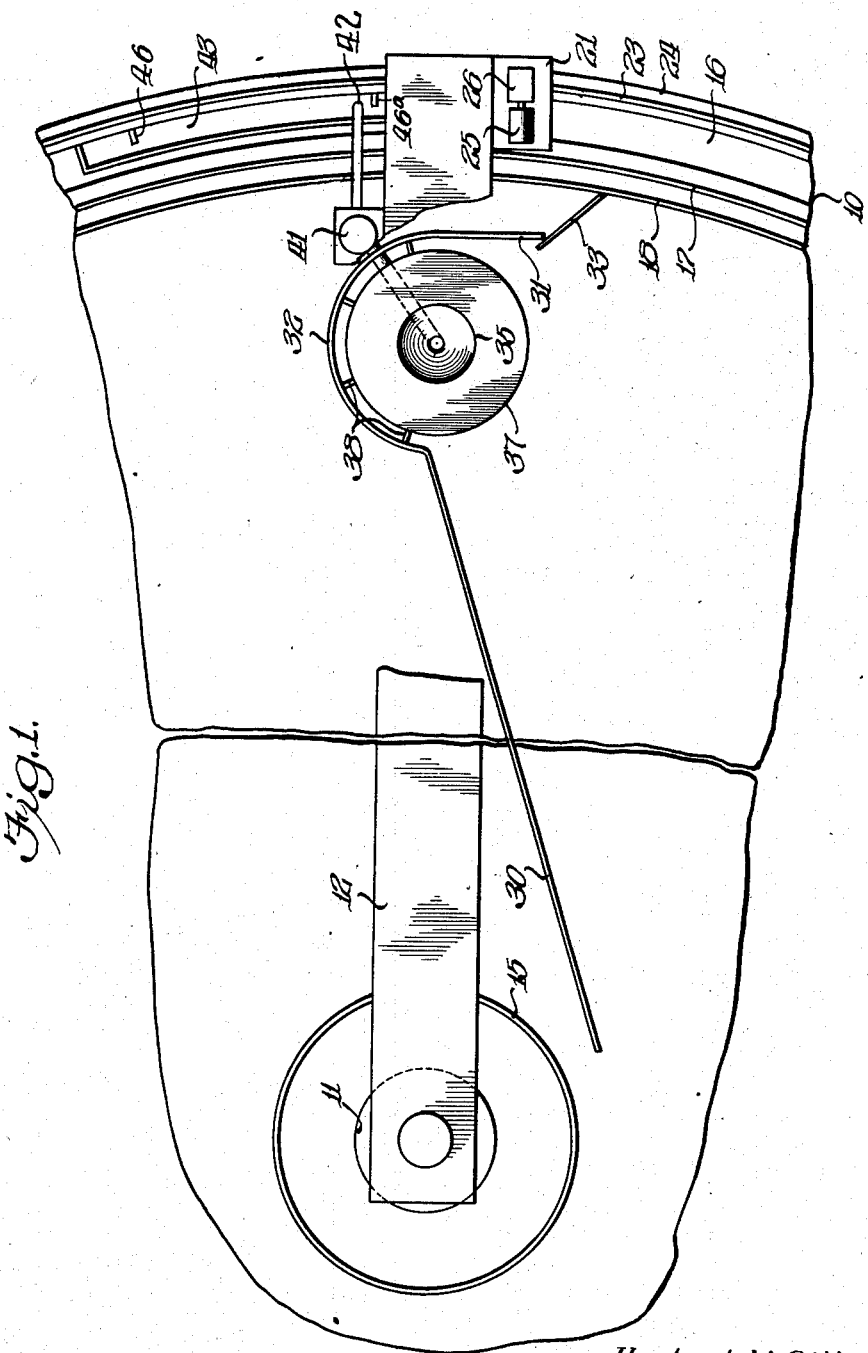
Figure 1 is a partial plan of a clarifying tank in which one embodiment of the scum skimmer of the present invention is shown.

As shown in Figures 1 and 2, the clarifying, or other liquid treatment tank, may be circular in shape and enclosed by a vertical wall 10. Customarily, the treating basin is provided with a solids scraping mechanism by which settled solids are moved to a disckharge sump. Many types of such construction are known, principally those in which the scraping mechanism is suspended from a fixed bridge across a diameter of the basin. However, I prefer a basin utilizing a central pillar 11 which supports a radial, rotatable bridge or walkway 12. In such a construction the liquid to be treated, such as sewage, may be admitted into the clarifier through an influent pipe 13 embedded in the pillar 11 and discharging, as at 14, into a central inlet well formed by an open ended cylinder 15 or other suitable baffle means.

An effluent channel 16 is ordinarily placed along the periphery of the clarifier 10 and separated therefrom by a weir 17. A scum baffle 19, supported by any suitable means such as brackets 19, is held in spaced relationship to the weir 17 to prevent scum, not shown, from flowing over the weir 17 into the effluent channel 16. As shown in Figure 2, the scum baffle 18 extends for a short distance above and below the liquid level, determined by the upper edge of the weir 17 so as to permit the ready flow of liquid from the clarifier adjacent the surface of liquid therein into the effluent channel.

In the embodiment of a treating basin shown, the bridge may be rotatably mounted at one end on a bearing 20, supported by the central pillar 11, and the other end may be supported by a carriage 21 provided with wheels 22 which ride upon a circumferential rail 23, which may be placed upon the vertical wall 24 of the effluent channel. The bridge may be rotated by any suitable means, such as a motor 25, provided with a reducer 26 driving the wheels 22 of the carriage 21. Such treating tanks are well known in the art and, as such, are not claimed herein.

The skimming mechanism of my invention comprises a vertical skimmer blade 30 extending from adjacent the inlet well 15 to adjacent the scum baffle 18, at an angle to the radius of the basin as shown in Figure 1. At the trailing end 31 of the skimmer blade 30, which preferably is the end adjacent the periphery of the tank, I place an accumulator, or accumlation bay 32, which may be of any desired shape, such as the arcuate form shown. Between the scum accumulation bay 32 and the scum baffle 18 I place a short skimming blade 33, so as to entrap scum which may be adjacent the scum baffle. Preferably the blade will be suspended by pivoted links 34, so constructed as to force the peripheral end of the blade into contact with the scum maffle 18 at all times. The skimming blades, 30 and 33, and the accumlation bay 32 may be suspended from the rotatable bridge, 12, or from any other suitable means.

A relatively large skimming member or plate 35 is centrally placed within the accumlation bay 32 for the removal of scum therefrom. The area of the skimming member or plate preferably has an area corresponding to the area of the accumulation bay, at least it should correspond to the area of the scum which will be accumulated therein. The skimming plate 35 may have a variety of forms such as a wide mouthed funnel or other type of vessel which provides a relatively long peripheral edge and preferably a shallow depression behind the edge. As illustrated in Figure 2 the mouth 36 of the funnel 35 is provided with a relatively wide peripheral flange 37 and is supported by any suitable means, such as brackets 38, in spaced relationship to the wall of the accumulation bay 32. As shown in the drawings, the outer edge of the flange or plate 37 of the skimming member 35 constitutes an effectively horizontal weiring edge of substantial length— and by "effectively horizontal" I means that it in such that I secure a uniform flow over all section of the weiring edge. The mouth 36 and the flange 37 are so placed as to be immediately below the surface of the liquid in the clarifier, so as to efficiently separate the scum from the liquid on which it collects. The skimming member 35 might be in the form of a substantially horizontal plate with an outlet pipe from an interior portion thereof but I prefer a form which provides a relatively shallow depression or chamber adjacent the outlet, such as the shallow funnel shown in the figures. I also prefer the use of substantially horizontal flange, as shown, in order to provide a surface with a relatively long weiring edge and of an area to underlie the body of scum which may be accumulated in the accumulation bay. Also it is preferable that the shape of the skimming, or weiring, edge which, as shown, is the outer edge of the skimming member, be such as to provide for substantially uniform flows across each section of such edge. It is intended that the skimming member 35 be permanently submerged and placed immediately below the surface of the liquid—as close to the lower surface of the scum as possible, such as about 1 inch or less below the liquid surface. This form provides for a flow of rather high velocity over the edge of the skimming plate 35, 37 and preferably the form of the plate is such as to provide a shallow depression therein, so as to avoid the necessity of moving a large volume of water, so that scum can quickly be separated and removed without much water.

The lower end of the hydraulic skimmer 35 leads into a pipe 39 curved to lead below and behind the scum scraper 32 and then upwardly above the surface of the liquid. A pump 40 driven by any suitable means, such as an electric motor 41, is provided in the pipe 39. A waste pipe 42 leads from the pump 40 to a scum box or trough 43, located adjacent the effluent channel 16. As shown in Figure 1, the scum receiving chamber or trough 43 may extend only a relatively short distance along the circumference of the effluent channel 16, as in most installations the formation of scum is so slow that only a short period during each rotation of the scum scraper is needed to remove all of the scum which collects in the accumulation pocket. Many methods are known by which the pump can be driven only during the time that the waste pipe 42 is passing over the scum box 43. By way of illustration only, the pump, which is also carried on the rotating bridge 12, can be driven by the electric motor 41. The motor may be wired to connect with a limit switch 45, actuated by any suitable means, such as catches 46 and 46a, located adjacent to the scum trough 43. In this manner the switch will be closed when the waste pipe comes over the scum box 43 and the pump will begin operation; and the switch will be opened as soon as the waste pipe 42 approaches the other end of the scum trough 43. The pump will thereupon be inactive until the skimmer has made a substantially complete circle and the waste pipe is again over the scum box 43.

The operation of the skimming mechanism will be readily understood. The rotation of the bridge 12 will cause rotation of the skimming blades 30 and 33, through the liquid at the surface of the liquid in the basin. Scum, and other floatable matter will be collected along the front edge of the blades. Due to the angular position of the blades, such floating matter will migrate to the scum accumulator 32 and will collect therein. When the motor 41 is operated by the closing of the limit swich 49, material over the flange 37 and the skimming chamber of funnel 35 will be drawn out by pump 40 and discharged into the scum box 43. The flange 37 is so located as to be immediately under the lower surface of the scum, so that at first only scum, which is above the flange, will be removed. As the scum passes over the surface of the flange, material further removed flows onto it. Due to the location of this flange, the tendency is for suction from the chamber 35 to draw only the scum from the level of the surface liquid, so that a minimum amount of liquid is withdrawn with the floatable matter.

A modified form of skimmer is shown in Figures 3 and 4. As shown in Figure 3 the hydraulic skimmer 50 is placed in the back of the accumulation pocket 32 and is attached thereto. The skimming chamber is of modified shape as shown in the drawings, with a skimming plate or flange 51 located only on the leading edge thereof. In this alternative form of a scum skimmer, scum will be drawn in only over the leading edge of the skimming surface or plate 51.

Another modified form of skimmer is shown in Figure 5. In this instance the hydraulic skimmer 60 is provided with an exceptionally large mouth 61. In this form a skimming surface or flange 62 may extend inwardly therefrom. Obviously, the skimming flange 62 may cover only an annular portion of the mouth of the skimmer 60, as it is necessary that a relatively large opening 63 permit the inflow of scum into the funnel.

As shown in all of the cross-sectional drawings, the flange 37 or 51 or 62 in the modified forms, extends substantially horizontal from the upper edge of the funnel mouth. In most instances it is preferred that these flanges be substantially horizontal. In some instances it may be desirable to have the flanges placed at a slight angle from the horizontal, usually sloping downwardly from the funnel to the periphery of the flange, so that larger pieces of matter which float upon the surface of the water can be drawn over the outer edge of the flange and be pushed by the pressure of the water into the funnel. In some instances it may be desirable to have the flange at at slight slope upwardly from the mouth of the funnel, but in all instances the flange will be substantially horizontal. It is desirable that the skimming member be of such shape as to provide a relatively long skimming or weiring edge and a shallow depression inwardly therefrom. It will be understood that it is preferred that the skimming plate, or member, be permanently submerged and that the material will be withdrawn downwardly therefrom at spaced intervals of time. As indicated above, the outer, or skimming edge 37 should be of substantial length and located quite close to the liquid surface. The outlet, preferably in the form of a funnel or similar vessel, is placed inwardly of such edge, of a size proportional to such edge, and leads downwardly therefrom. The skimming plate may be adjustable, if desired, in order to permit accurate adjustment to meet changing conditions, as it is desired that the weiring edge be as close to the under surface of the scum as possible in order to permit complete removal of scum with a minimum amount of water.

Manifestly, many modifications and variations of the invention hereinbefore set forth may be made by persons skilled in the art without departing from the spirit and scope hereof. Accordingly, the appended claims are to be given an interpretation commensuate with the novelty herein described and as broad as may be permitted by prior art.

I claim:

1. A device for removing floatable material from the surface of a liquid comprising a skimming blade penetrating the surface of the liquid and movable across the surface thereof, means forming a horizontally extending accumulation bay adjacent one end of said blades, a funnel within the accumulation bay provided with a substantially horizontal peripheral flange, the upper rim of said funnel and said flange being located immediately below the surface of the liquid, said funnel and said flange together having a horizontal area corresponding to the area of the accumulation bay, means for moving the blade across the surface of the liquid, and means for withdrawing material from the lower part of said funnel.

2. A device for removing floatable material from the surface of a liquid comprising a blade penetrating the surface of the liquid and movable angularly across the surface thereof, means forming a laterally extending accumulation bay in said blade, a vessel located in the back portion of said bay, a substantially horizontal skimming plate in front of said vessel and joining said vessel to the blade, said vessel and skimming plate being located immediately below the surface of the liquid, means for moving said blade across the surface of the liquid and means for withdrawing material from the bottom of said vessel.

3. A device for removing floatable material from the surface of a liquid comprising a blade penetrating the surface of the liquid, means for moving said blade across the surface of said liquid, a horizontally extending accumulation bay adjacent one end of said blade, a skimming member comprising a funnel and a substantially horizontal peripheral flange at the upper edge thereof and a conduit leading downwardly from the lower part of said funnel, said skimming member being continuously submerged and of a size corresponding to the size of said accumulation bay, and located to underlie scum accumulated in said bay, means controlling liquid flow through said conduit, and means to initiate periodically operation of said flow control means.

4. A device for removing scum from the surface of a liquid, comprising a skimming blade extending across and penetrating the surface of the liquid, means for moving said blade across said liquid surface, a scum accumulating bay adjacent one end of said blade, a submerged skimming plate of a size corresponding to the size of said bay and located to underlie scum accumulated in said bay, said plate having an effectively horizontal skimming edge immediately below the surface of the liquid and a continuously submerged outlet, said outlet being positioned within the confines of said plate and inwardly from said skimming edge, a conduit leading from said outlet, and means to control flow through said conduit.

5. Apparatus as described in claim 4 wherein the skimming plate abuts said skimming blade for a substantial portion of the periphery of said bay.

6. A device for removing scum from the surface of a liquid comprising in cooperative relationship a skimming blade, means for moving said blade across the liquid surface, a scum collecting bay positioned to receive scum from said blade, a substantially horizontal skimming plate lying under but adjacent the liquid surface, said skimming plate being of size corresponding to that of said bay and being so located relative to said bay as to underlie scum accumulated and moving forward in said bay, a continuously submerged outlet for withdrawing scum from said bay over said plate, said outlet leading downwardly from a central point within the area of said plate, a conduit leading from said outlet to a point outside the liquid being skimmed, and means to control flow through said outlet conduit.

7. In liquid treating apparatus comprising a tank, said tank having an overflow weir for treated liquid and a scum baffle in front of said weir, an improved device for removing scum from the liquid surface, said device comprising in cooperative relationship a skimming blade extending across and penetrating the surface of liquid in said tank, means for moving said blade horizontally, a scum accumulating bay moving with and receiving scum moved by said blade and located adjacent said scum baffle, an effectively horizontal skimming edge of length corresponding to the width of said bay, said edge lying below but adjacent the liquid surface, a submerged plate extending rearwardly of said edge and underlying scum in said bay, a submerged outlet opening centrally located in said plate, a conduit extending downwardly from said opening, and means to control flow through said conduit.

8. In liquid treating apparatus comprising a tank, said tank having an overflow weir for treated liquid and a scum baffle in front of said weir, an improved device for removing the scum from the liquid surface comprising a scum receiving chamber behind said scum baffle, a skimming blade extending across and penetrating the surface of the liquid in said tank, means for moving said blade across the surface of liquid in said tank, means forming a scum accumulating bay at the end of said blade adjacent said scum baffle, a skimming plate permanently located immediately below the liquid surface in said tank and so positioned as to underlie scum accumulated in said bay, said skimming plate being of size corresponding to the size of said bay, an outlet opening in the center portion of said plate, a conduit extending downwardly from said opening and discharging into said scum chamber, means to control flow through said conduit, and means operable from the position of said scum bay to control the period of flow through said conduit.

9. In a liquid purifying apparatus comprising a settling tank, a weir for overflow of liquid from said tank, a scum baffle inwardly of said weir, an improved device for removing scum from the surface of the liquid comprising a skimming blade extending across and penetrating the surface of the liquid, a scum accumulating bay in said blade adjacent said scum baffle, means for moving said blade across said liquid surface, a skimming plate within said bay moving with said blade, and so positioned as to lie immediately below the surface of liquid in said tank, an outlet opening in the rearward portion of said plate, a conduit extending downwardly from said outlet and thence upwardly to a point of discharge behind said scum baffle, a pump on said conduit, a scum collecting trough extending a predetermined distance along the wall of said tank and so positioned as to underlie the point of discharge of said conduit during a portion of its travel, and means to cause operation of said pump during a portion of the travel of said point of discharge above said scum trough.

10. An improved device for removing scum accumulated on the surface of a liquid comprising a means forming a scum accumulation bay, an effectively horizontal skimming plate permanently within said accumulation bay and so positioned that its uppermost portion is immediately below the surface of the liquid, a permanently submerged outlet in an inner portion of said plate, an outlet conduit leading from said outlet to a point removed from said liquid, and means for controlling withdrawal of liquid through said conduit.

11. The apparatus of claim 10 wherein the plate is positioned with its upper edge about 1" or less below the surface of the liquid.

12. A method of removing scum from a liquid which comprises pushing scum horizontally over the surface of the liquid into an accumulation zone substantially smaller than the area of the liquid, maintaining an impervious surface having an area corresponding to the area of the zone permanently below and immediately subjacent the lower surface of the scum in said accumulation zone, said surface having an effectively horizontal outer weiring edge, and periodically removing scum accumulated in such zone by withdrawing liquid inwardly over said surface and downwardly at an interior point thereof, whereby the scum is hydraulically carried over said weiring edge and over the impervious surface at a rapid velocity to the point of withdrawal.

13. A method of removing scum from the surface of a liquid which comprises pushing the scum across the surface of the liquid into a scum accumulation zone, maintaining an impervious surface submerged below the level of the liquid in said scum accumulation zone, said surface being of an area corresponding to the area of the scum accumulation zone and having an effectively horizontal weiring edge immediately below the surface of the liquid, and withdrawing liquid downwardly from an inner portion of said surface in a manner to produce a uniform inward flow over each section of said edge.

14. A device for removing scum from the surface of a liquid comprising a scum receiving space, means to guide scum into said space, a submerged scum skimmer permanently underlying a portion of said space, said skimmer having a horizontal weir edge, a permanently submerged scum outlet from said skimmer, a conduit leading from said outlet, and means for controlling flow of scum from said skimmer through said outlet conduit.

15. A method of removing scum from a liquid surface which comprises mechanically pushing scum to an accumulation zone on the liquid surface and to a continuously submerged impervious surface, said impervious surface having an outer weiring edge of substantial length positioned below and immediately adjacent the lower surface of the scum, lowering the liquid level over said impervious surface by withdrawing scum downwardly from such zone through an interior portion of such impervious surface to a point of discharge, whereby scum is floated inwardly over the weiring edge.

HERBERT W. GILLARD.